US009960858B2

(12) United States Patent
Shinotsuka et al.

(10) Patent No.: US 9,960,858 B2
(45) Date of Patent: May 1, 2018

(54) POSITIONAL INFORMATION TRANSMISSION SYSTEM, POSITIONAL INFORMATION TRANSMITTER, AND POSITIONAL INFORMATION TRANSMITTING METHOD

(71) Applicants: Michiaki Shinotsuka, Kanagawa (JP); Tsutomu Kawase, Kanagawa (JP)

(72) Inventors: Michiaki Shinotsuka, Kanagawa (JP); Tsutomu Kawase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 14/608,323

(22) Filed: Jan. 29, 2015

(65) Prior Publication Data

US 2015/0222370 A1    Aug. 6, 2015

(30) Foreign Application Priority Data

Jan. 31, 2014  (JP) ................................ 2014-016426
Jul. 30, 2014  (JP) ................................ 2014-154655

(51) Int. Cl.
*G01S 5/00*   (2006.01)
*H04B 11/00*  (2006.01)
*G01S 1/72*   (2006.01)
*G01S 5/18*   (2006.01)

(52) U.S. Cl.
CPC ................ *H04B 11/00* (2013.01); *G01S 1/72* (2013.01); *G01S 5/18* (2013.01)

(58) Field of Classification Search
CPC ..................................... G01S 5/18; G01S 1/72
See application file for complete search history.

(56) References Cited

U.S. PATENT DOCUMENTS

| 9,361,630 | B1 * | 6/2016 | Goswami ........... G06Q 30/0267 |
| 2006/0013070 | A1 * | 1/2006 | Holm ..................... G01S 5/0081 |
| | | | 367/128 |
| 2006/0077759 | A1 * | 4/2006 | Holm ..................... G01S 5/0036 |
| | | | 367/128 |
| 2007/0010200 | A1 | 1/2007 | Kaneko |
| 2009/0201850 | A1 | 8/2009 | Davis et al. |

(Continued)

FOREIGN PATENT DOCUMENTS

| JP | 9-114485 | 5/1997 |
| JP | 2002-261747 | 9/2002 |

(Continued)

OTHER PUBLICATIONS

Extended European Search Report dated Jul. 3, 2015.
U.S. Appl. No. 14/295,450, filed Jun. 4, 2014.
U.S. Appl. No. 14/469,712, filed Aug. 27, 2014.

*Primary Examiner* — Hovhannes Baghdasaryan
(74) *Attorney, Agent, or Firm* — Harness, Dickey & Pierce, P.L.C.

(57) ABSTRACT

A novel positional information transmission system includes a plurality of positional information transmission units. The positional information transmission unit includes a close-range wireless communication unit that performs close-range wireless communication and a sonic wave transmission unit that transmits positional information as a sonic signal used for detecting a position of a receiver that receives the sonic signal based on information transmitted by the close-range wireless communication unit.

14 Claims, 11 Drawing Sheets

(56) References Cited

U.S. PATENT DOCUMENTS

| | | | |
|---|---|---|---|
| 2013/0065611 A1 | 3/2013 | Park et al. | |
| 2013/0083631 A1* | 4/2013 | Harrell | G01S 5/26 367/127 |
| 2013/0234893 A1 | 9/2013 | Kusakari et al. | |
| 2013/0306903 A1 | 11/2013 | Shinotsuka | |

FOREIGN PATENT DOCUMENTS

| | | |
|---|---|---|
| JP | 2005-038115 | 2/2005 |
| JP | 2011-070516 | 4/2011 |
| JP | 2013-214941 | 10/2013 |
| WO | WO2006/001140 A1 | 1/2006 |

* cited by examiner

| PAN NUMBER | SPEAKER ID | POSITION COORDINATE | DESCRIPTION OF POSITION |
|---|---|---|---|
| ID0001 | | (x0001, y0001, z0001) | WEST END, 1ST FLOOR |
| ID0002 | | (x0002, y0001, z0001) | CENTER, 1ST FLOOR |
| ID0003 | | (x0003, y0001, z0001) | EAST END, 1ST FLOOR |
| ID0004 | | (x0001, y0001, z0002) | WEST END, 1ST FLOOR |
| ID0005 | | (x0002, y0001, z0002) | CENTER, 1ST FLOOR |
| ID0006 | | (x0003, y0001, z0002) | EAST END, 1ST FLOOR |
| ID0007 | | (x0001, y0001, z0003) | WEST END, 1ST FLOOR |
| ID0008 | | (x0002, y0001, z0003) | CENTER, 1ST FLOOR |
| ID0009 | | (x0003, y0001, z0003) | EAST END, 1ST FLOOR |
| ⋮ | ⋮ | ⋮ | ⋮ |

| PAN NUMBER | SPEAKER ID | POSITION COORDINATE | DESCRIPTION OF POSITION |
|---|---|---|---|
| ID0001 | SP10001 | (x0001, y0001, z0001) | WEST END, 1ST FLOOR |
| ID0002 | SP10002 | (x0002, y0001, z0001) | CENTER, 1ST FLOOR |
| ID0003 | SP10003 | (x0003, y0001, z0001) | EAST END, 1ST FLOOR |
| ID0004 | SP20001 | (x0001, y0001, z0002) | WEST END, 1ST FLOOR |
| ID0005 | SP20002 | (x0002, y0001, z0002) | CENTER, 1ST FLOOR |
| ID0006 | SP20003 | (x0003, y0001, z0002) | EAST END, 1ST FLOOR |
| ID0007 | SP30001 | (x0001, y0001, z0003) | WEST END, 1ST FLOOR |
| ID0008 | SP30002 | (x0002, y0001, z0003) | CENTER, 1ST FLOOR |
| ID0009 | SP30003 | (x0003, y0001, z0003) | EAST END, 1ST FLOOR |
| ⋮ | ⋮ | ⋮ | ⋮ |

POSITIONAL INFORMATION TRANSMISSION SYSTEM, POSITIONAL INFORMATION TRANSMITTER, AND POSITIONAL INFORMATION TRANSMITTING METHOD

CROSS-REFERENCE TO RELATED APPLICATION

This patent application is based on and claims priority pursuant to 35 U.S.C. § 119(a) to Japanese Patent Applications No. 2014-016426, filed on Jan. 31, 2014 and No. 2014-154655, filed on Jul. 30, 2014 in the Japan Patent Office, the entire disclosure of which is hereby incorporated by reference herein.

BACKGROUND

Technical Field

The present invention relates to a positional information transmission system, a positional information transmitter, and a positional information transmitting method.

Background Art

Recently, starting with car navigation systems, portable information devices such as smartphones and tablet computers include a Global Positioning System (GPS) function. In the GPS, multiple GPS satellites that orbit around the earth transmit wireless signals that indicate time, and receivers receive those signals. Subsequently, distance between the receiver and the satellites is calculated based on difference between time when the satellites transmit the wireless signals and time when the communication device receives the wireless signals, and a position on the earth is specified based on the calculation result. By using the GPS function described above, it is possible to check a current position on a map and utilize a routing guidance by user operation using the portable information devices.

However, in the GPS that receives radio wave from the satellites described above, since the wireless signal strength is weak in areas such as underground malls and interiors, it is difficult to utilize the services such as displaying the current position and routing guidance described above in some cases.

A technology called Indoor Messaging System (IMES) as an indoor positioning technology that enables to utilize the positional information even in areas such as the underground malls is known. In the IMES, indoor transmitters are installed, and the indoor transmitters transmit the positional information of the transmitter as radio wave. The receivers receive the positional information of the indoor transmitters, and it is possible to acquire the position of the receiver. Conventionally, technologies that utilize the IMES are known.

Other than that, indoor positioning technologies such as a technology that transmits beacon information from access points in a wireless local area network (LAN) and a technology that transmits beacon on a Bluetooth Low Energy (BLE) signal are known. In addition, regarding the routing guidance described above, a system that registers information such as a train route map and a train timetable in Radio Frequency Identification (RFID) tags, installs the RFID tags, and enables users to scan the information such as the train route map and the train timetable by holding a reader on the RFID tag.

SUMMARY

An example embodiment of the present invention provides a novel positional information transmission system that includes a plurality of positional information transmission units. The positional information transmission unit includes a close-range wireless communication unit that performs close-range wireless communication and a sonic wave transmission unit that transmits positional information as a sonic signal used for detecting a position of a receiver that receives the sonic signal based on information transmitted by the close-range wireless communication unit.

Further example embodiments of the present invention provide a positional information transmitting method for the positional information transmission system.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
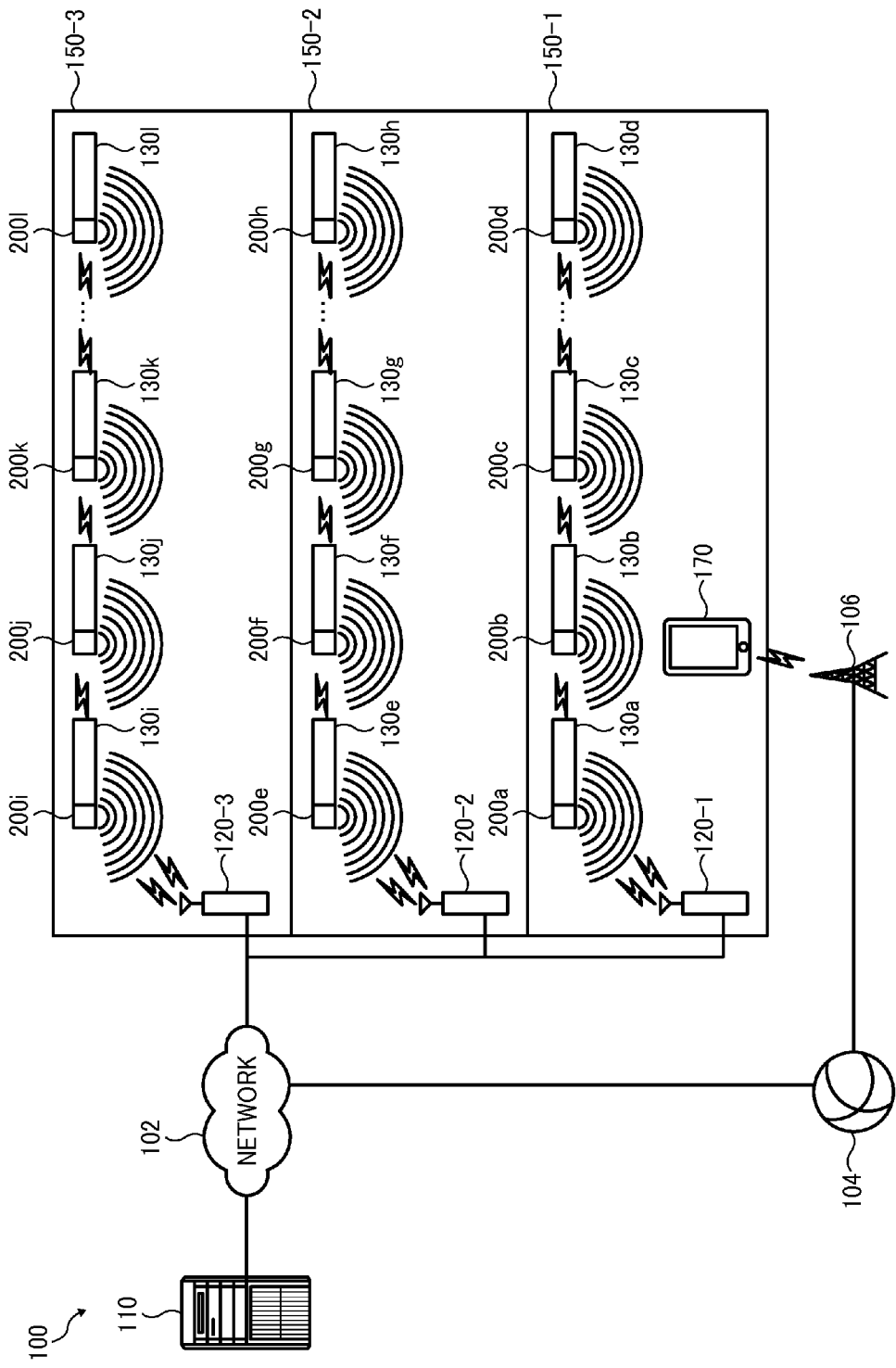
FIG. 1 is a schematic diagram illustrating an entire configuration of a routing guidance system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In conventional technologies described above, it is desired to configure each of the installed indoor transmitters to transmit the positional information. If identification information is used as the positional information, the identification information is updated regularly since fixed identification information is not preferable. In that case, it is desired to distribute configuration information each time the identification information is updated. However, it is impossible to distribute the configuration information described above effectively in the conventional technologies.

In the following embodiment, a novel positional information transmission system that distributes positional information that a receiver acquires a position to multiple positional information transmitter effectively and instructs each of the positional information transmitters to transmit the positional information as sonic signals is provided.

In the embodiment described below, a routing guidance system 100 that includes a lighting device 130 (a positional information transmission module 200) that includes a Personal Area Network (PAN) communication unit and a speaker is taken as an example of a positional information transmission system that includes a positional information transmitter that includes a close-range wireless communication unit and a sonic wave transmission unit.

FIG. 1 is a schematic diagram illustrating an entire configuration of a routing guidance system 100 in this embodiment. In the routing guidance system 100, multiple positional information transmission modules 200 are laid out on one or more indoor floors 150, and it is possible to identify each of the floors 150 and detect three-dimensional positions.

More specifically, the routing guidance system 100 includes a position management server 110 that manages positions of multiple laid out positional information transmission modules 200, a PAN transceiver 120 connected to the positional management server 110 via a network 102, and multiple positional information transmission modules 200 laid out on each of the floors 150. In FIG. 1, there are three indoor floors 150-1 to 150-3, and the PAN transceivers 120-1 to 120-3 installed on each of the floors communicate with the positional information transmission modules 200 on each of the floors.

In the embodiment described above, the positional information transmission module 200 is included in the lighting device 130 such as a Light Emitting Diode (LED) lighting device, and the positional information transmission module 200 functions powered by a power supply in the lighting device. In the preferable embodiment, it is possible to utilize the positional information transmission module 200 included in the lighting device 130 from a viewpoint that the lighting devices are installed at a predetermined interval indoors and an existing wiring facility for lighting can be used easily. However, the positional information transmission module 200 is not limited to the specific example described in this embodiment. It is possible that the positional information transmission module 200 is attached to other devices or installed on a wall or a ceiling separately.

To manage a position of the positional information transmission module 200, the positional management server 110 stores positional coordinate information measured preliminarily (e.g., longitude and latitude on a predetermined geographical coordinate system and building floor information or altitude) associated with specific identification information to identify the positional information transmission module 200 specifically. Furthermore, to manage information transmitted by the positional information transmission module 200, the positional management server 110 generates positional information and stores it associated with the specific identification information. Information used by the receiver to detect the position is referred to as positional information hereinafter. Positional information is associated with the positional coordinate information at least. More specifically, it is possible to use identification information allocated temporarily.

The PAN transceiver 120 intermediates communication between the positional information transmission module 200 and the positional management server 110 on the network 102. The network 102 is a wired/wireless network such as a Local Area Network (LAN) and a Wide Area Network (WAN) etc. The PAN transceiver 120 communicates with the positional management server 110 via the network 102, receives the positional information from the positional management server 110, and transfers the positional information to the positional information transmission module 200 using the close-range wireless communication.

As described later, the positional information transmission module 200 includes the speaker etc. and transmits the positional information as the sonic signal using the speaker. Furthermore, the positional information transmission module 200 includes the PAN communication unit. The positional information received from the positional management server 110 via the PAN transceiver 120 is used as the positional information that the positional information transmission module 200 transmits. In addition, since the close-range wireless communication is established within a distance 1 cm to several meters, the area that the PAN transceiver 120 can communicate directly is limited. Therefore, in this embodiment described below, the positional information transmission modules 200 communicate with each other using the close-range wireless communication, and it is possible to propagate the positional information from point to point. As described above, one or more positional information transmission modules 200 are installed in one space associated by the PAN.

In the preferable embodiment, the positional information transmission module 200 is close to the speaker and includes a microphone. As a result, it is possible to check a signal transmitted by the speaker that transmits the positional information described above as the sonic signal, check output, and diagnose malfunction. In addition, by measuring surrounding sonic wave using the microphone, it is possible to measure the noise level due to crowdedness and weather condition such as rain at the installation environment and generate the sonic wave appropriately in accordance with the noise level.

As described above, by installing the positional information transmission module 200 that includes the microphone, it is possible to check the output sonic wave transmitted by the positional information transmission module 200 and check the surrounding sonic wave condition three-dimensionally. It should be noted that it is possible to install the microphone associated with the speaker one-to-one. In addition, the microphone can be installed thinning out alternately for example, and that is not limited to those examples.

In the routing guidance system 100 in this embodiment, it is possible to hold the portable information device 170 as the positional information utilization device and access the routing guidance service using the portable information device 170 by user operation. The portable information device 170 communicates with the position management server 110 via a base station 106 and a public network 104 such as the third-generation mobile communication system (3G) and Long Term Evolution (LTE). Otherwise, the portable information device 170 can communicate with the position management server 110 using wireless LAN via a wireless LAN access point (not shown in figures).

On the portable information device 170, an application that acquires the position coordinate by receiving the sonic signal transmitted by the positional information transmission module 200, displays the current position using the acquired position coordinate, and performs the routing guidance is installed. The portable information device 170 acquires its current position coordinate by receiving the sonic signal from the positional information transmission module 200 and querying the position management server 110 based on the sonic signal. After acquiring the position coordinate, it is possible to display a map and show the routing guidance using the current position coordinate.

Figure 2:
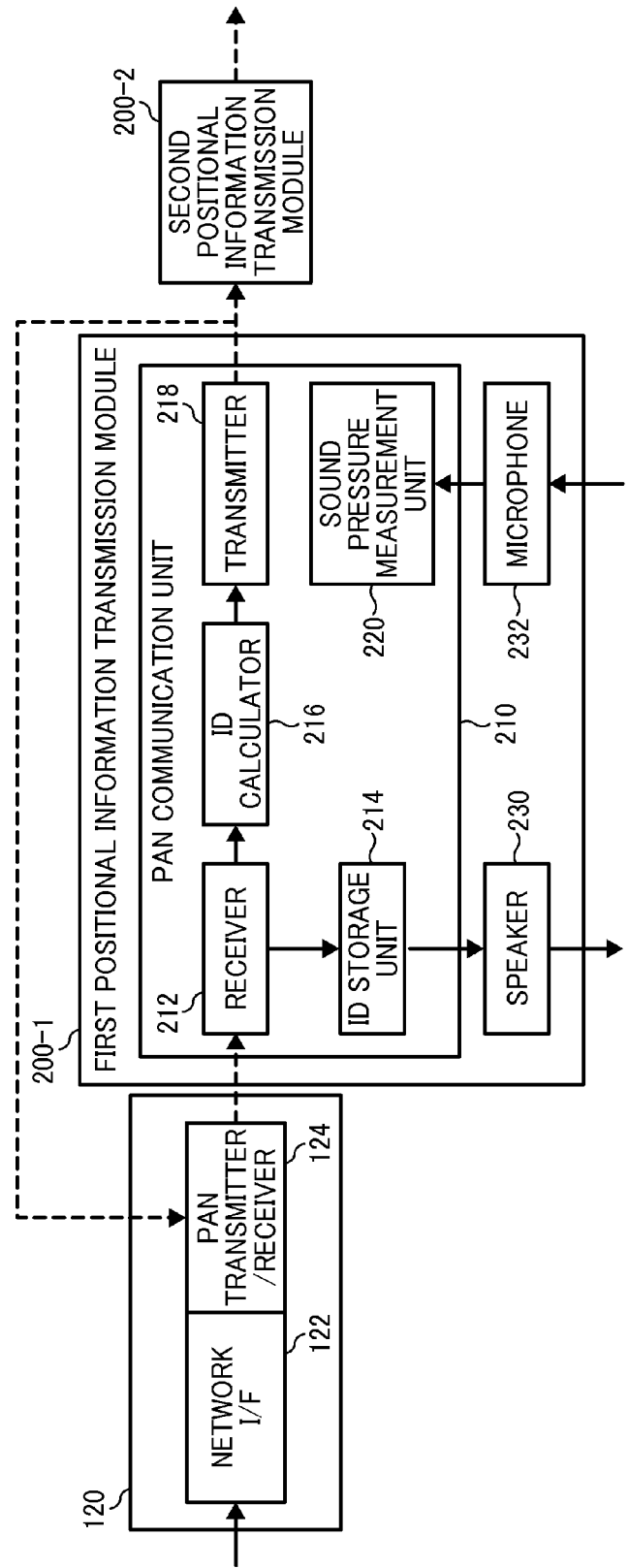
FIG. 2 is a block diagram illustrating functions around a positional information transmission module that comprises the routing guidance system as an embodiment of the present invention.

The positional information transmission module 200 in this embodiment is described below in detail with reference to FIG. 2. FIG. 2 is a block diagram illustrating functions around the positional information transmission module 200 that comprises the routing guidance system 100 in this embodiment. In addition, a functional configuration of the PAN transceiver 120 is illustrated in FIG. 2. The PAN transceiver 120 includes a network I/F 122 for connecting with the network 102 using wired or wireless communication and a PAN transceiver unit 124 for performing the close-range wireless communication.

In FIG. 2, a first positional information transmission module 200-1 is taken as a representative, and its detailed functional blocks are illustrated. As shown in FIG. 2, the positional information transmission module 200 includes a PAN communication unit 210 as a close-range wireless communication unit for performing the close-range wireless communication. The first positional information transmission module 200-1 communicates with the PAN transceiver 120 and an adjacent second positional information transmission module 200-2 using the PAN communication unit 210. Furthermore, the positional information transmission module 200 includes a speaker 230 for transmitting the positional information described above as the sonic signal.

In the preferable embodiment shown in FIG. 2, furthermore, the positional information transmission module 200 includes a microphone for measuring the output sonic wave from the speaker 230 and the surrounding sonic wave condition. In the description below, it is considered that the microphone 232 is installed inside the positional information transmission module 200. However, it is possible to install the microphone 232 at a position where a S/N ratio that can check the sound pressure transmitted by the speaker 230 and the surrounding noise can be acquired. The microphone 232 comprises a sonic wave reception unit included in the positional information transmission unit in this embodiment.

In the positional information transmission module 200, it is desired to configure the positional information for transmitting as the sonic signal preliminarily. The PAN communication unit 210 is in charge of configuring the positional information preliminarily.

More specifically, the PAN communication unit 210 includes a receiver 212, an ID storage unit 214, an ID calculation unit 216, and a transmitter 218. The receiver 212 receives the positional information from the PAN transceiver 120 or the adjacent second positional information transmission module 200-2 using the close-range wireless communication. In this embodiment, the speaker ID updated regularly or irregularly is used as the positional information.

In addition, in the close-range wireless communication, it is possible to communicate in cipher. The ID storage unit 214 stores the speaker ID allocated to the positional information transmission module 200 received by the receiver 212 After generating a speaker driving signal based on the speaker ID stored in the ID storage unit 214, the speaker 230 transmits the sonic signal. Other information such as updated date/time (updated date/time information) can be included in combination with the speaker ID.

The ID calculator 216 calculates the speaker ID allocated to the adjacent positional information transmission module based on its own speaker ID. A calculating method of the speaker ID of the adjacent module (hereinafter referred to as "adjacent speaker ID") is not limited particularly. It is possible to calculate the adjacent speaker ID by inputting the conveyed speaker ID in a predetermined function. More simply, it is possible to calculate the adjacent speaker ID by inputting its own speaker ID in a function that increments an input value by one.

The transmitter 218 transmits the calculated adjacent speaker ID to the adjacent second positional information transmission module 200-2 using the close-range wireless communication. Furthermore, the transmitter 218 transmits the calculated adjacent speaker ID to the PAN transceiver 120 and instructs the position management server 110 to associate the adjacent speaker ID with the position coordinate information.

In this embodiment, the speaker ID that the position management server 110 conveyed is assigned to the positional information transmission module (e.g., the first module 200-1) that communicates with the position management server directly via the PAN transceiver 120. By contrast, the positional information transmission module that the speaker ID has been conveyed already calculates the adjacent speaker ID and transmits the adjacent speaker ID to the positional information transmission module (e.g., the second module 200-2) that cannot communicate with the position management server directly. As a result, it is possible to distribute the positional information to one or more positional information transmission modules 200 that cannot communicate with the position management server 110 directly one after another.

In this embodiment, the first module 200-1 calculates the speaker ID for the adjacent second module 200-2 and transmits the adjacent speaker ID to the adjacent second module 200-2. However, in another embodiment, it is possible that the first module 200-1 transmits its own speaker ID as is to the adjacent second module 200-2 and the adjacent second module 200-2 calculates its own speaker ID based on the received speaker ID for the first module 200-1.

The speaker 230 is a sonic wave generating unit that transmits the speaker ID conveyed by the PAN communication unit 210 as the sonic signal. The speaker 230 transmits the sonic signal based on the speaker ID acquired by the PAN communication unit 210 and stored in the storage unit 214 regularly or irregularly.

The sonic signal is transmitted in the way that a user cannot hear. Usually, a limit of acoustic sense that a human can hear is about 16 KHz if the sound pressure is equal to or less than 50 dB, and a human can hardly hear the sonic wave with more frequency. In addition, it is considered that normal human conversation is up to around 7 KHz, and the microphone included in recent smartphones can sense up to around 20 KHz, more preferably around 24 KHz. Therefore, in the preferable embodiment, it is possible to generate the sonic wave whose frequency area is around 16 KHz to 24 KHz that a human can hardly hear and typical smartphones can catch. A configuration of the speaker 230 used in the preferable embodiment is described in detail later.

In the preferable embodiment shown in FIG. 2, furthermore, the PAN communication unit 210 includes a sound pressure measurement unit 220 that measures the output sonic wave from the speaker 230 and the surrounding sonic wave condition. The sound pressure measurement unit 220 can measure the surrounding sonic wave condition around the area where the positional information transmission module 200 is installed using the microphone 232 and feedback it to the output of the speaker 230 in accordance with the measured noise level. Furthermore, the sound pressure measurement unit 220 can measure the output sonic wave transmitted through the speaker 230 by the positional information transmission module 200 using the microphone 232 and determines whether or not the correct ID can be checked. If the correct ID can be checked, the sound pressure measurement unit 220 measures the sound pressure and feedback it to the output of the speaker 230. Known microphones such as a directional or nondirectional condenser microphone that can catch a frequency band 16 KHz to 24 KHz can be used as the microphone 232.

In the preferable embodiment, the transmitter 218 transmits the measurement result of the output sonic wave transmitted by the speaker 230 and the surrounding sonic wave condition to the PAN transceiver 120, and the position management server 110 can store the measurement result. In addition, in the preferable embodiment, the receiver 212 can receive the output level of the speaker 230 that the position management server 110 determines based on the measurement result via the PAN transceiver 120.

Furthermore, the transceiver 212 can receive the measurement result by the adjacent second positional information transmission module 200-2 using the close-range wireless communication from the adjacent second positional information transmission module 200-2. In this case, the transceiver 218 can transfer the measurement result by the adjacent second positional information transmission module 200-2 to the PAN transceiver 120. In addition, the transceiver 218 can transfer the output level received from the PAN transceiver 120 to the PAN transceiver 120.

As described above, it is possible that one or more positional information transmission modules 200 that cannot communicate with the position management server 110 directly reports to the position management server 110 about the measurement result one after another, and it is possible to distribute the output level from the position management server 110 to one or more positional information transmission modules 200 that cannot communicate with the position management server 110 directly one after another.

Figure 3:
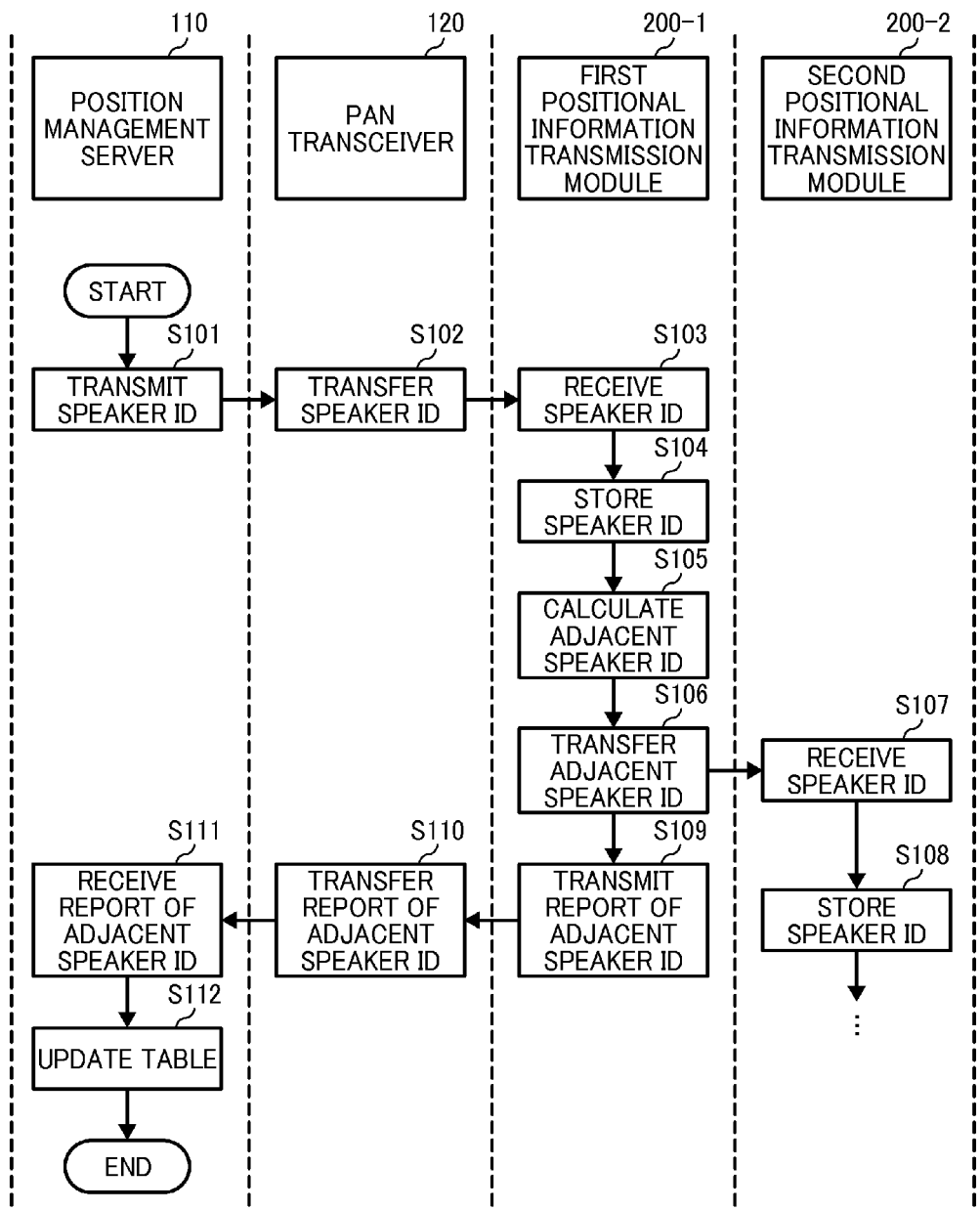
FIG. 3 is a flowchart illustrating a process of configuring positional information in the routing guidance system as an embodiment of the present invention.
Figure 4:
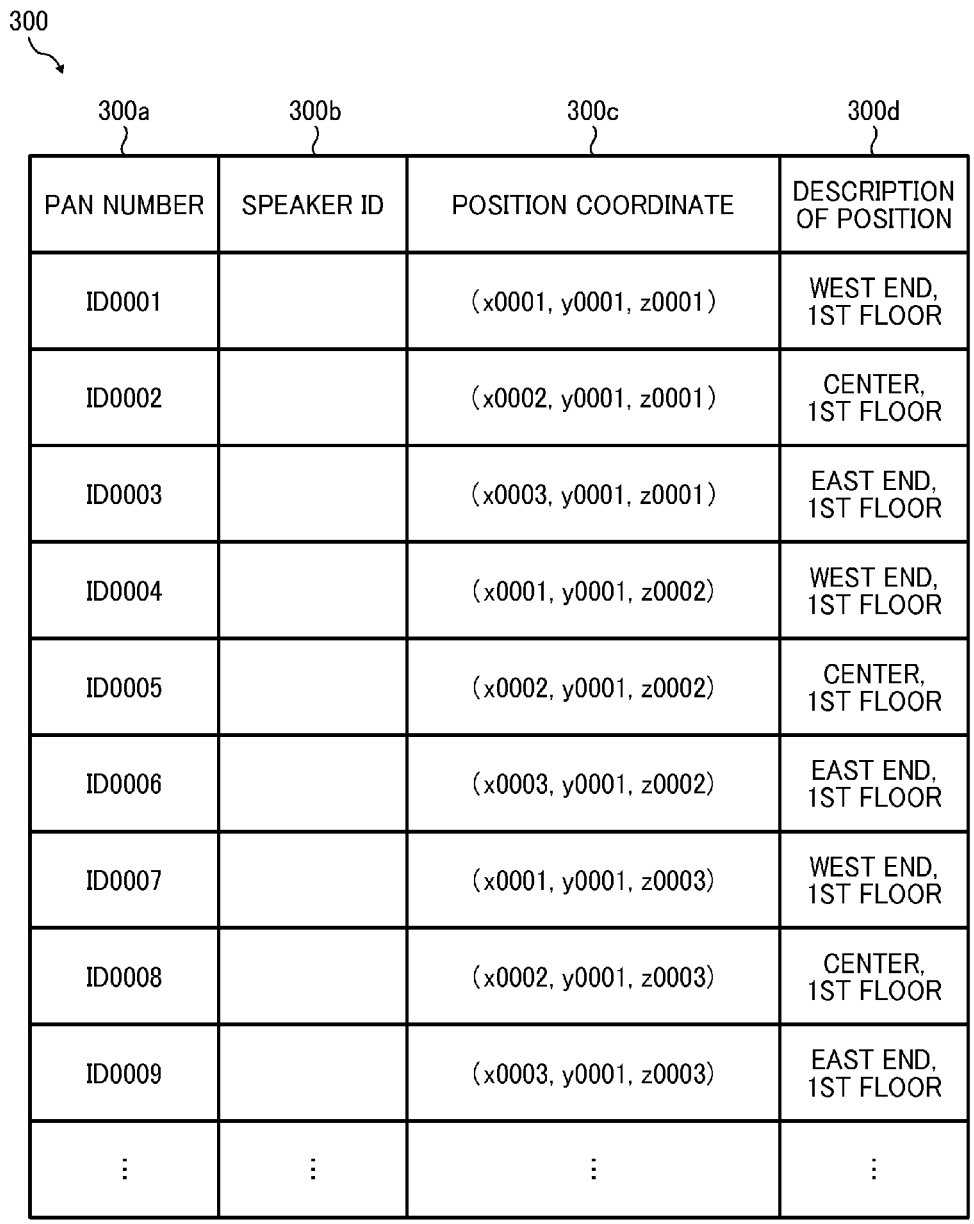
FIG. 4 is a diagram illustrating a position management table before configuring positional information managed by a position management server as an embodiment of the present invention.
Figure 5:
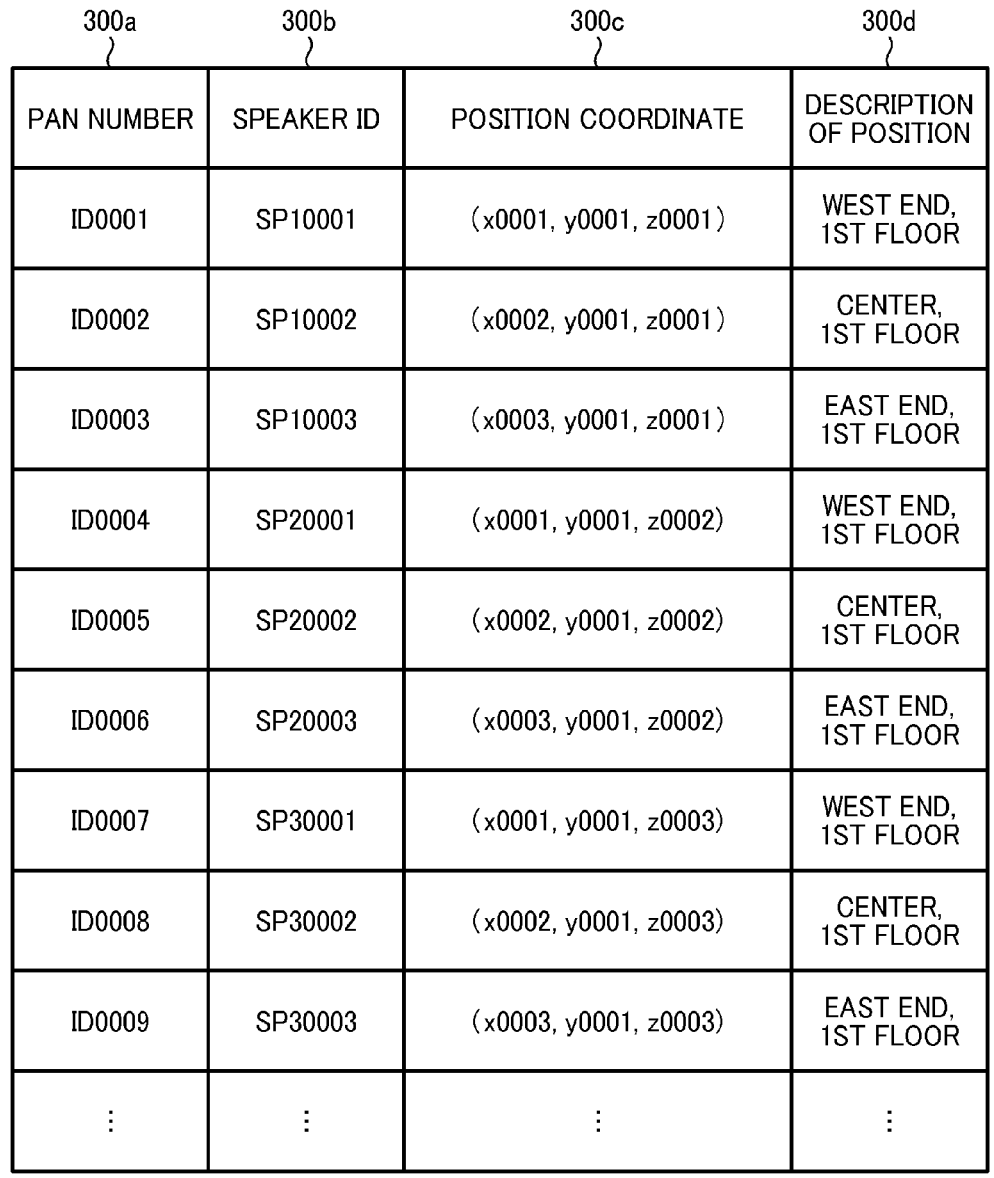
FIG. 5 is a diagram illustrating a position management table after configuring positional information managed by the position management server as an embodiment of the present invention.

A process of configuring positional information of each module in the routing guidance system 100 in this embodiment is described below with reference to FIGS. 3 to 5. FIG. 3 is a flowchart illustrating a process of configuring positional information in the routing guidance system 100 in this embodiment. FIGS. 4 and 5 are diagrams illustrating position management tables managed by the position management server 110 FIG. 4 is a diagram illustrating a position management table before configuring positional information, and FIG. 5 is a diagram illustrating a position management table after configuring positional information In FIG. 3, after starting the process, the position management server 110 transfers the speaker ID to the PAN transceiver 120 in S101. The PAN transceiver 120 transfers the speaker ID received from the position management server 110 to the first module 200-1 in S102. The first module 200-1 receives the speaker ID using the receiver 212 in S103, and the first module 200-1 stores the speaker ID in the ID storage unit 214 in S104.

The first module 200-1 calculates the adjacent speaker ID for the adjacent module using the ID calculator 216 in S105. The first module 200-1 transfers the adjacent speaker ID to the second module 200-2 using the transmitter 218 in S106. The second module 200-2 receives the speaker ID from the first module 200-1 in S107, and the second module 200-2 stores the received speaker ID as its own speaker ID in the ID storage unit 214 in S107. Similarly, the ID for the adjacent third positional information transmission module 200-3 is calculated and transferred to the third positional information transmission module appropriately one after another. (Here, those descriptions are omitted.)

Furthermore, the first module 200-1 transfers the adjacent speaker ID report combining the calculated adjacent speaker ID and the specific identification information of the adjacent module to the PAN transceiver 120 using the transmitter 218 in S109. The PAN transceiver 120 transfers the report that includes the adjacent speaker ID and the specific identification information received from the first module 200-1 to the position management server 110 in S110.

The speaker ID is generated by the position management server 110 and the positional information transmission module 200. Here, the position management server 110 cannot detect the speaker ID generated in the positional information transmission module 200 as it stands. The report of the adjacent speaker ID is for making the position management server 110 recognize that the adjacent speaker id is configured to the module identified by the specific identification information and associate the information with the position coordinate information by returning the adjacent speaker ID and the specific identification information of the adjacent module to the position management server 110.

The position management server 110 receives the report of the adjacent speaker ID in S111. The position management server 110 stores the reported adjacent speaker ID in a record in a position management table 300 corresponding to the reported specific identification information in S112, and the process ends.

The positional management table 300 in FIG. 4 includes a record that includes specific identification information (ID number) 300a, a speaker ID 300b, a position coordinate 300c, and description information on position 300d for each of the positional information transmission module 200 to be managed. The description of position 300d is a field that stores other related information such as a description associated with the position coordinates, a timetable, store information, store URL, and distance from transportation.

As shown in FIG. 4, before processing the configuration, only the position coordinate 300c and the description information of position 300d are stored associated with the positional information transmission module 200, and the speaker ID field 300b is empty. By contrast, after finishing the process of configuring the positional information for all of the positional information transmission modules, as shown in FIG. 5, the speaker ID field 300d is filled, and the position coordinates are managed associated with each of the speaker IDs.

It should be noted that the position coordinate 300c of the positional information transmission module 200 is measured at the installation site preliminarily using a device when the positional information transmission module 200 is installed and the measurement value is input. Similarly, the description information of position 300*d* is also input appropriately when the positional information transmission module 200 is installed.

As shown in FIG. 3, by calculating the speaker ID by the positional information transmission module 200, it is possible not to query the server, and it is possible to reduce a processing load in the entire system.

Figure 6:
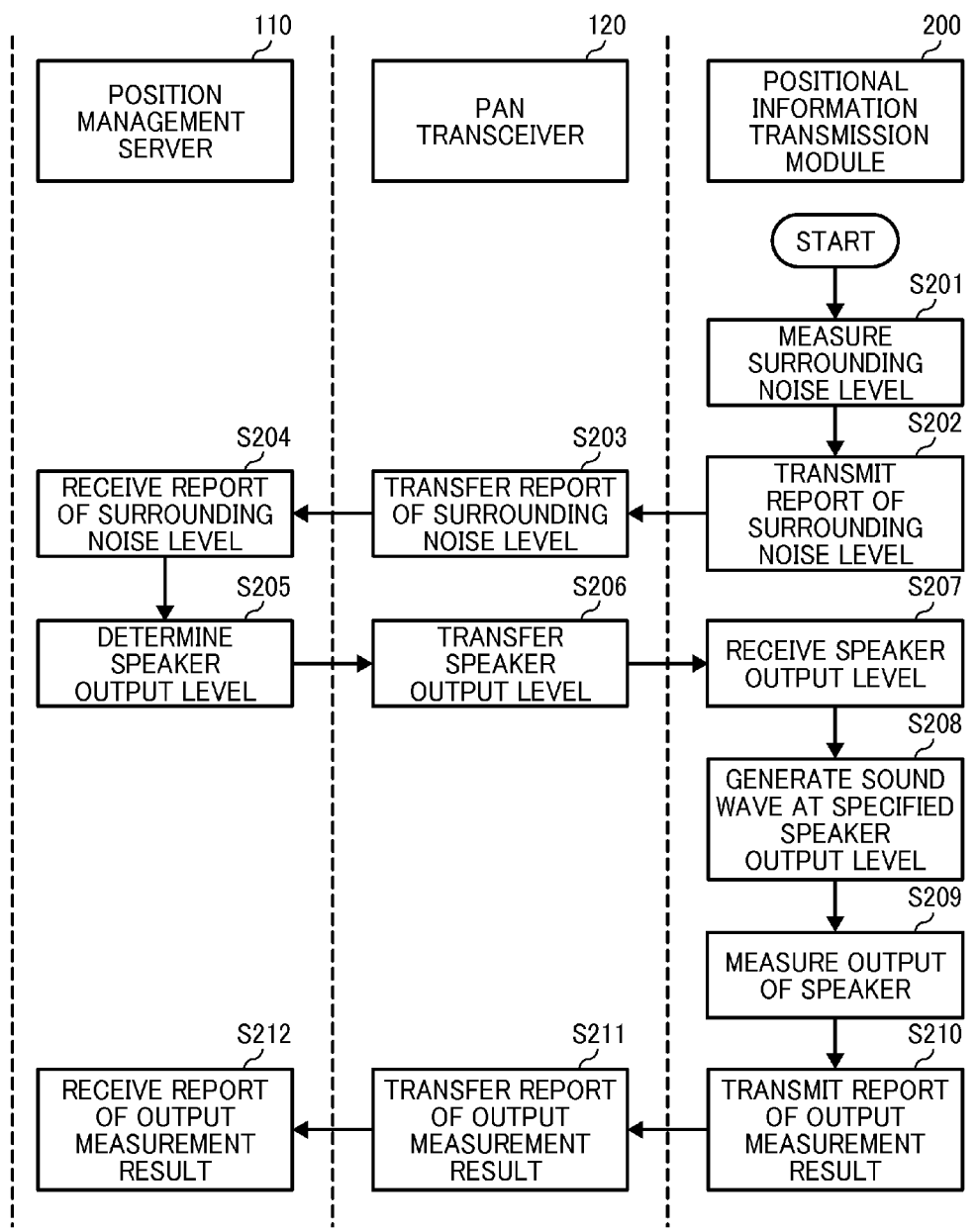
FIG. 6 is a flowchart illustrating a process of determining and checking output sound pressure in the routing guidance system as an embodiment of the present invention.
Figure 7:
FIG. 7 is a diagram illustrating a table associating surrounding noise level with speaker output level managed by the position management server as an embodiment of the present invention.

A process of determining and checking the output sound pressure in the routing guidance system 100 in this embodiment is described below with reference to FIGS. 6 and 7. FIG. 6 is a flowchart illustrating a process of determining and checking output sound pressure in the routing guidance system 100 in this embodiment. FIG. 7 is a diagram illustrating a table associating surrounding noise level with speaker output level managed by the position management server.

A process in FIG. 6 starts regularly, irregularly, or at a timing when it is requested to check the sound pressure in response to a request from the position management server 110. The positional information transmission module 200 measures the surrounding noise level by the sound pressure measurement unit 220 using the microphone 232 in S201.

In measuring the surrounding noise level, it is possible to sample noise whose bandwidth is 14 KHz to 16 KHz reducing frequency used as a signal by a frequency filter in multiple times (e.g., about ten times) and use the average value.

The positional information transmission module 200 transfers a report of the measured surrounding noise level to the PAN transceiver 120 using the transmitter 218 in S202. The surrounding noise level can be a measured value, or it is possible to express the surrounding noise level by a level identifier associated with a range of the measured value. The PAN transceiver 120 transfers the report of the surrounding noise level received from the positional information transmission module 200 to the position management server 110 in S203.

The position management server 110 receives the report of the surrounding noise level from the PAN transceiver 120 in S204. In S205, the position management server 110 refers to the table shown in FIG. 7, acquires the speaker output level corresponding to the reported surrounding noise level, determines that the acquired speaker output level is to be used, and transfers the output level (or a current value to implement the output level) to the PAN transceiver 120. The PAN transceiver 120 transfers the speaker output level received from the position management server 110 to the positional information transmission module 200 in S206. The positional information transmission module 200 receives the determined speaker output level using the receiver 212 in S207.

The positional information transmission module 200 transmits the sonic signal using the speaker 230 based on the received speaker output level and the speaker ID stored in the ID storage unit 214 in S208. The positional information transmission module 200 measures the speaker output by the sound pressure measurement unit 220 using the microphone 232 while the sonic signal described above is transmitted in S209.

In measuring the sonic signal from the speaker 230, it is possible to determine whether or not the speaker ID is output correctly by disabling the frequency filter described above and trying to extract the speaker ID from the received sonic signal. In addition, in measuring the sonic signal from the speaker 230, it is possible to determine whether or not the speaker 230 output the sonic signal at a correct output level by measuring the sonic pressure at a peak value.

The positional information transmission module 200 transfers a report of the measurement result of the output from the speaker 230 to the PAN transceiver 120 using the transmitter 218 in S210. The measurement result of the output can include the speaker ID extracted from the output sonic wave and the peak sound pressure level when the peak value is received. The PAN transceiver 120 transfers the report of the measurement result of the output received from the positional information transmission module 200 to the position management server 110 in S211.

The position management server 110 receives the report of the measurement result of the output from the PAN transceiver 120 in S212. Afterwards, the position management server 110 can check whether or not the correct ID is output based on the speaker ID included in the measurement result of the output. Furthermore, the position management server 110 can check whether or not the output level is appropriate based on the sound pressure level included in the measurement result of the output.

For example, the position management server 110 can refer to the table shown in FIG. 7, acquire an estimate value of the sound pressure level corresponding the determined speaker output level, and compare it with the sound level included in the measurement result of the output. In this case, if the sound level included in the measurement result of the output is out of range centering on the estimate value of the sound pressure level, the position management server 110 can feedback the positional information transmission module 200 to raise the output level or lower the output level than before so that the appropriate sound pressure level can be acquired. In addition, if the correct ID is not extracted, the position management server 110 determines that the positional information transmission module 200 is malfunctioning.

Figure 8:
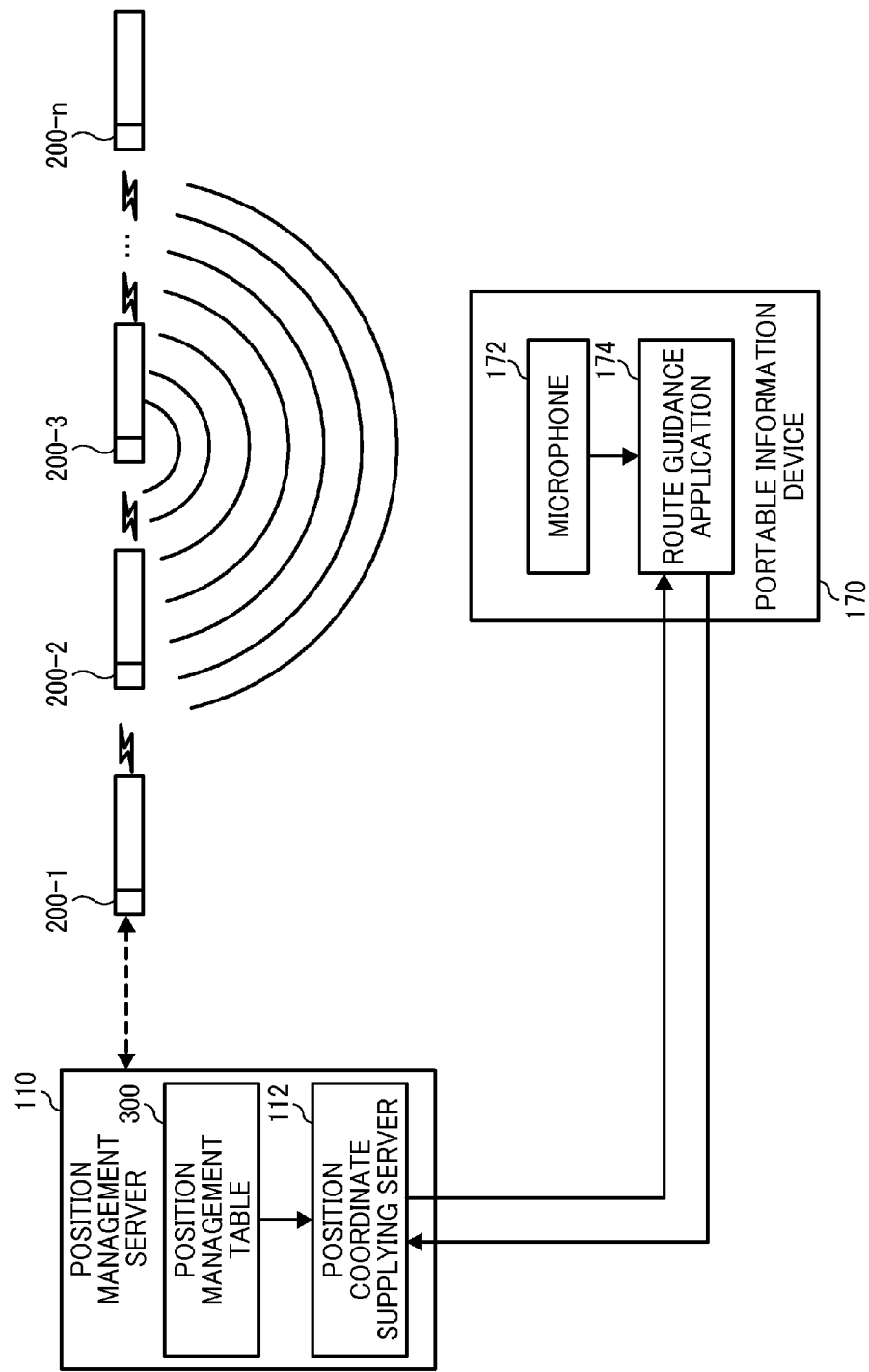
FIG. 8 is a block diagram illustrating functions related to a current position display function provided by the routing guidance system as an embodiment of the present invention.

A function of displaying current position accessed by the portable information device 170 is described below with reference to FIGS. 8 to 10. FIG. 8 is a block diagram illustrating functions related to a current position display function provided by the routing guidance system 100 in this embodiment.

As shown in FIG. 8, the position management server 110 stores the position management table 300 in FIG. 4. The position management server 110 includes a position coordinate providing server 112 that refers to the position management table 300 in response to an inquiry about position from an external device and provides the corresponding position coordinate. The position coordinate providing server 112 is installed on the position management server 110 as a server program.

In response to an inquiry about position from an external device, the position coordinate providing server 112 searches for a position coordinate associated with the speaker ID included in the inquiry through the position management table 300 and returns the discovered position coordinate as a response to the inquiry about position. Here, it is possible to include related information such as store information, advertisement, store URL, distance from transportation, and timetable in the response in addition to the position coordinate.

On the other hand, on the portable information device 170, a routing guidance application 174 that acquires the position coordinate by receiving the sonic signal transmitted by the positional information transmission module 200, displays the current position using the acquired position coordinate, and performs the routing guidance is installed. The routing guidance application 174 is configured so that it can accept sound signal input from the microphone 172 included in the portable information device 170. To utilize the position information from the routing guidance system 100, it is desired to download the program of the routing guidance application preliminarily or acquire the program via a recording media, install the program in the portable information device 170 and execute it.

The routing guidance application 174 extracts the speaker ID based on the sound signal input and inquire of the position management server 110 about position using the speaker ID. In addition, the routing guidance application 174 can acquire the position coordinate included in the response from the position management server 110 and display the current position in combination with a surrounding map and information such as store information around the current position coordinate on the display. The routing guidance application 174 in this embodiment includes an extraction unit that extracts the speaker ID from the sonic signal and a conversion unit that converts the response from the position management server 110 into position coordinates in geographical coordinate system by inquiring of the position management server 110.

Figure 9:
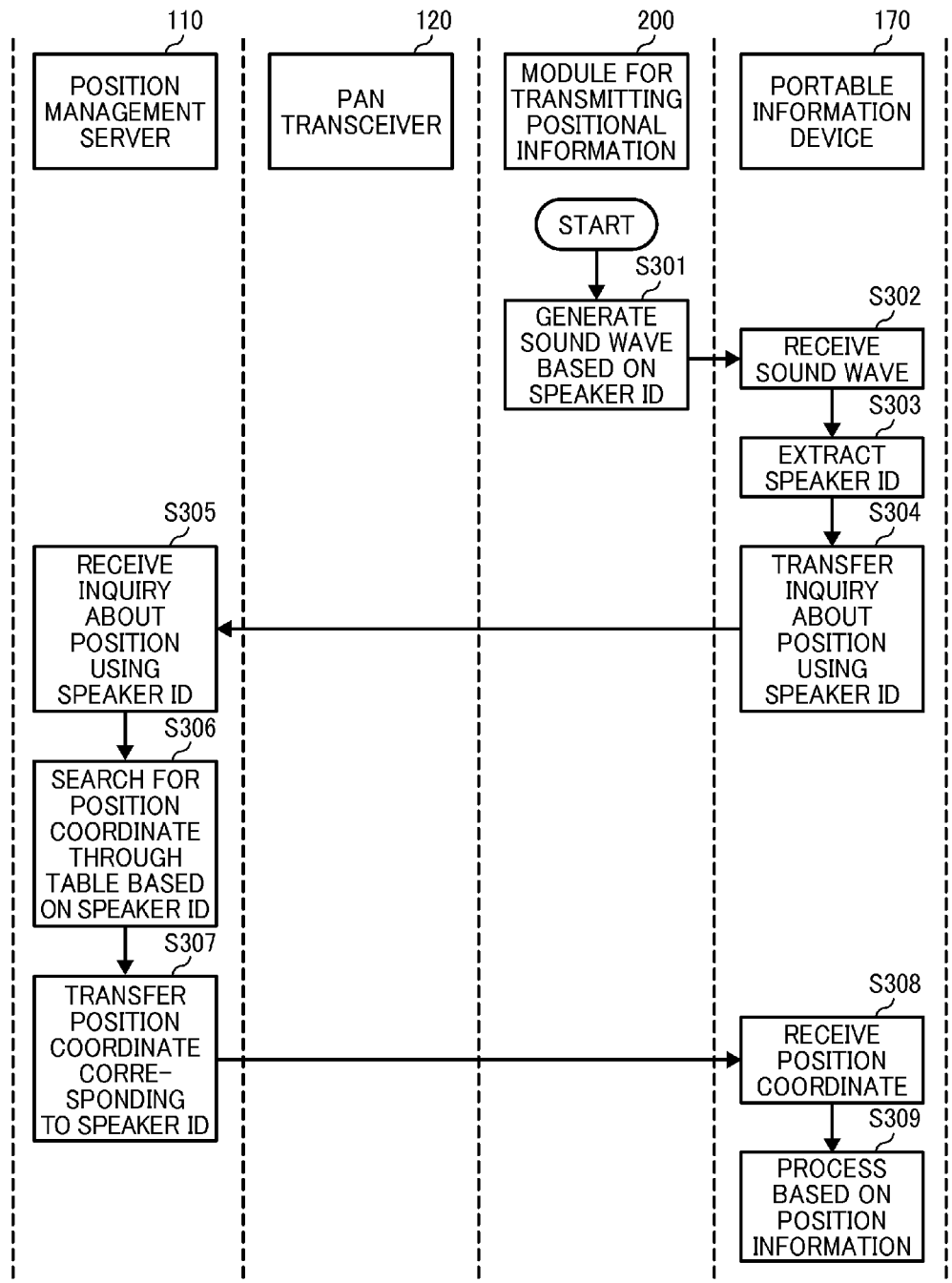
FIG. 9 is a flowchart illustrating a process of displaying a current position in the routing guidance system as an embodiment of the present invention.

FIG. 9 is a flowchart illustrating a process of displaying a current position in the routing guidance system 100 in this embodiment. FIG. 10 is a diagram illustrating a screen of displaying the current position displayed by the routing guidance application 174.

In FIG. 9, the process starts after the positional information transmission module 200 receives its own speaker ID and stores it in the ID storage unit 214. The positional information transmission module 200 starts transmitting the sonic signal using the speaker 230 at the currently configured output level based on the speaker ID stored in the ID storage unit 214 in S301.

On the portable information device 170, the sound signal is input to the routing guidance application using the microphone 172, and the sonic signal is received in S302. The portable information device 170 extracts the speaker ID based on the sound input signal in S303. The portable information device 170 inquires of the position management server 110 about position using the extracted speaker ID via the network in S304.

The position management server 110 receives the inquiry from the portable information device 170 in S305. The position management server 110 searches for the position coordinate associated with the speaker ID included in the inquiry through the position management table 300 in S306. The position management server 110 transfers the position coordinate corresponding to the speaker ID included in the inquiry to the portable information device 170 as the inquiry origin in S307.

Figure 10:
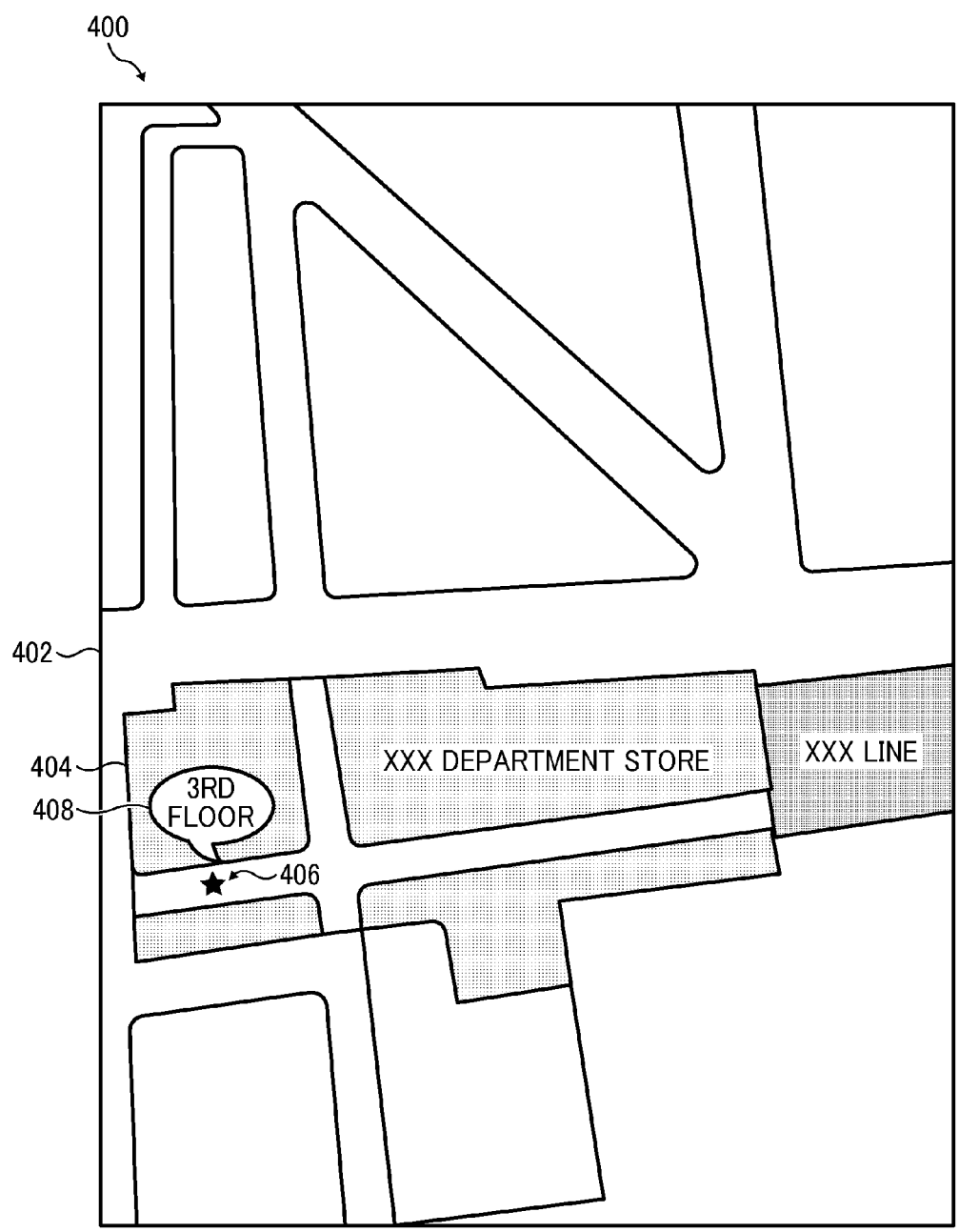
FIG. 10 is a diagram illustrating a screen of displaying the current position displayed by a routing guidance application in a portable information device in the routing guidance system as an embodiment of the present invention.

The portable information device 170 receives the position coordinate as the response to the inquiry in S308, and the portable information device 170 displays the screen of displaying the current position 400 in FIG. 10 based on the acquired current position coordinate. In this embodiment, the position coordinate returned by the position management server 110 is handled as the position coordinate of the portable information device 170 as is. However, in another embodiment, if sonic signals from multiple positional information transmission modules 200 can be detected separately, it is possible to calculate the position coordinate of the portable information device 170 from the acquired multiple positional coordinates.

In FIG. 10, on the screen of displaying the current position 400, a floor map 404 of a building where the current position coordinate of the portable information device 170 exists is imposed on a map image 402. The screen of displaying the current position 400 includes a mark 406 that indicates the current position coordinate of the portable information device 170 on the map image 402 and a balloon 408 that indicates floor information. It is possible to display store information and routing guidance from the current position to the destination on the screen described above (not shown in figures).

By using the routing guidance system 100 described above, the receiver can detect its position based on the sonic signal from the positional information transmission module 200 even indoors and in underground malls where GPS wave is weak. For example, the extraction process of the positional information based on the sound signal input described above is enabled in response to cases that the normal GPS function built in the portable information device 170 cannot acquire the positional information and it is detected that the user enters a building where modules are installed registered preliminarily by using the normal GPS function, and it is possible to start positioning using the positional information detection modules seamlessly from the positioning using the GPS function.

The positional information transmission module 200 in the preferable embodiment is described below in detail much more with reference to FIG. 11. FIG. 11 is a diagram illustrating steps of making a speaker included in a positional information transmission module in this embodiment. The speaker 230 in FIG. 11 is constructed as a cylindrical or hemicylindrical speaker.

Figure 11A:
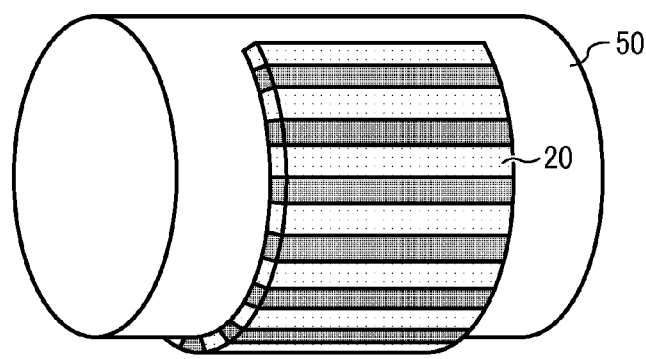
FIGS. 11A, 11B, 11C are diagrams illustrating steps of making a speaker included in a positional information transmission module as an embodiment of the present invention.
Figure 11B:
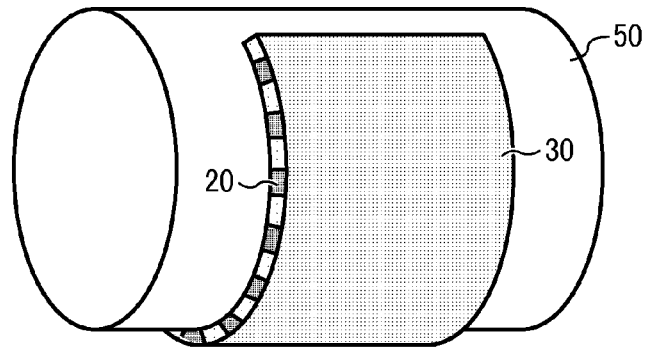
Figure 11C:
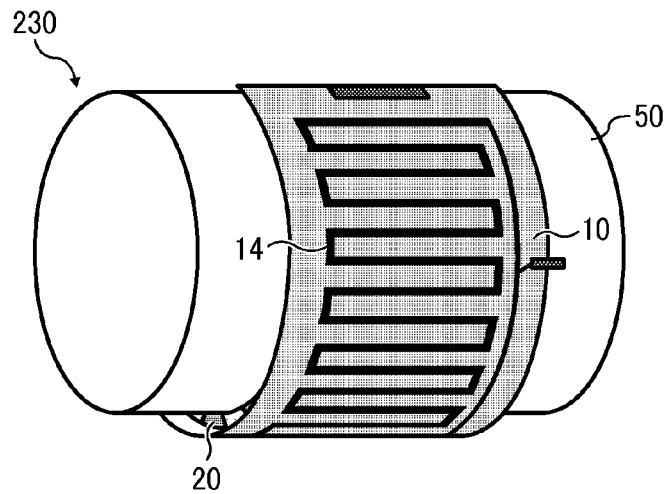

In manufacturing the speaker 230, first, a permanent magnet 20 is fixed around a perimeter surface of a cylinder 50 as shown in FIG. 11A. In this embodiment, it is also possible to embed the permanent magnet 20 in the cylinder 50 forming a concave part in accordance with thickness of the permanent magnet 20 on the perimeter surface of the cylinder 50. Subsequently, as shown in FIG. 11B, a buffer film 30 is formed covering the entire surface or a part of the permanent magnet 20. On top of that, as shown in FIG. 11C, a diaphragm 10 as a flexible board on which the coil 14 is formed is laid out. By laying out the buffer film 30, it is possible to avoid adhesion between the diaphragm 10 and the permanent magnet 20 and split vibration of the diaphragm 10 and ensure a desired range of motion so that the diaphragm 10 can vibrate with enough amplitude.

In a preferable embodiment, the cylindrical or hemicylindrical speaker 230 shown in FIG. 11 is laid out on the perimeter or an inner periphery of a cover of a strip LED lamp, and the PAN communication unit 210 is laid out inside the cover. In this case, by supplying power to the PAN communication unit 210 and the speaker 230 by a lighting device in which the LED lamp is laid out, it is unnecessary to prepare a power supply separately. Since alternative power is supplied to the lighting device, the lighting device is suitable as the power supply for the speaker 230. Furthermore, since the positional information transmission module 200 can be installed substituting with the lamp of an existing lighting device, it is unnecessary to work on a power supply. In addition, since the speaker ID can be transferred using the PAN communication, it is unnecessary to lay out the wired network.

As described above, if the speaker 230 is laid out around the strip LED lamp, it is preferable not to lay out the speaker 230 in the area just above the emitting element of the LED lighting lamp, since the magnet is degaussed due to heat and that results in decreasing the sound pressure. Regarding the heat from the LED lighting, the temperature can go up to 50° C. using a lamp whose wattage is 6 to 16 W. By not laying out the speaker 230 in the area just above the LED emitting element, it is possible to prevent the heat from working on the speaker 230 directly and prevent the sound pressure from deteriorating. In addition, since the light from the LED emitting element radiates in about 30 degrees typically, it is preferable to lay out the speaker away from the area just above the LED emitting element more than 15 degrees.

In addition, it is not always desired to lay out the speaker 230 around the split LED lamp. However, by laying out the speaker adjacent to the outer surface of the LED lamp, it is possible to enhance effectiveness in viewpoint of delivering predetermined sound pressure to a point a predetermined distance away. Since the sonic wave used in this embodiment corresponds to the lower limit of the supersonic and relatively goes straight, it is possible to expand a delivery area of the positional information by using the cylindrical or hemicylindrical speaker, and it is unnecessary to install multiple speakers.

As described above, in this embodiment, it is possible to distribute the positional information for acquiring the position by the receiver to the multiple positional information transmission device effectively, and it is possible that each of the positional information transmission devices transmits the positional information as the sonic signal. As a result, it is possible to provide a novel positional information transmission system, a positional information transmission device, and a positional information transmitting method.

In the configuration described above, by transferring the positional information to one positional information transmission module 200 in the network, the positional information is transmitted to the module 200 one after another using the close-range wireless communication, and it is possible to configure the positional information effectively.

By forming a network installing the speakers 230 and transmitting the transmitted positional information as the sonic signal, it is possible to complement the GPS function in the underground malls where the GPS signal does not reach. Unlike IMES, it is unnecessary to prepare a GPS module compatible with IMES in terminal devices. Since the portable information device 170 just receives the sonic signal from the speaker 230 about 1 to 2 meters away, that is preferable in viewpoint of power consumption. Furthermore, since the information that the speaker 230 transmits is associated with an absolute position coordinate in the geographical coordinates, it is possible to provide information on positions of multiple stores associated with the absolute position coordinate and traffic information. Furthermore, since the information on the routing guidance system 100 is updated on the network at any time, time until the update and cost do not occur. Furthermore, even in case of a large scale disaster etc., if the power is supplied to the lighting only using a backup power supply, it is possible to drive the speaker, start transmitting the positional information, utilize the routing guidance, and display the current position. In addition, since the carrier that transmits the positional information is sonic wave, that can prevent from interfering with electromagnetic wave from other apparatuses such as wireless LAN, Bluetooth, and a microwave, and the transmission rate is stable.

Furthermore, in the preferable embodiment, the microphone 232 is laid out adjacent to the speaker 230, and it is possible to measure the sonic wave circumstance in the surrounding environment and the output circumstance from the speaker 230. As a result, the positional information transmission module 200 can acquire its own sonic signal, signal output and information on malfunction without going through an external device such as a smartphone, and it is possible to manage malfunction information etc. in an integrated fashion by transferring that information to the position management server 110. In addition, it is possible to cope with fluctuation of noise level in the surrounding environment due to crowdedness of people and weather condition such as rain. For example, the positional information transmission module 200 installed in noisy environment transmits the speaker ID at high sound pressure, and the smartphone can detect it even in the noisy area or noisy occasion. The positional information transmission module 200 installed in noiseless environment transmits the speaker ID at sound pressure as low as possible, and it is possible to reduce the power consumption of the speaker and minimize impact of the sonic signal whose range is 16 KHz to 24 KHz on environment as possible.

The layout of the positional information transmission modules on each floor can be one-dimensional array or two-dimensional array. The number of the positional information transmission modules is not limited, and the number of floors is not limited either.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The present invention also encompasses a non-transitory recording medium storing a program that executes a positional information transmitting method for the positional information transmission system. The positional information transmitting method, performed by the positional information transmission system, includes the steps of receiving information by performing close-range wireless communication, configuring positional information used for detecting a position of a receiver based on information received using the close-range wireless communication, and transmitting the positional information as a sonic signal.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A positional information transmission system comprising a plurality of positional information transmission devices, wherein:
   a first positional information transmission device of the plurality includes a close-range wireless communication unit configured to perform close-range wireless communication with at least one network transceiver and a second positional information transmission device of the plurality, the close-range wireless communication unit being configured to,
      receive, via the at least one network transceiver, first positional information from a server configured to store a table mapping between (i) specific device identification information, (ii) positional information, and (iii) position coordinate information for each positional information transmission device of the plurality, wherein the first positional information is generated by the server and comprises first temporary identification information associated with first specific device identification information and first position coordinate information of the first positional information transmission device stored in the table managed by the server,
      determine second positional information, comprising second temporary identification information for the second positional information transmission device, based on the received first positional information comprising the first temporary identification information, and
      transmit the determined second positional information comprising the second temporary identification information to the second positional information transmission device, and to the server via the at least one network transceiver, with an instruction for the server to associate the second temporary identification information with second specific device identification information and second position coordinate information of the second positional information transmission device in the table managed by the server; and
   each respective positional information transmission device of the plurality includes a sonic wave generation unit configured to,
      generate a respective sonic signal based on respective positional information comprising respective temporary identification information associated with respective specific device identification information and respective position coordinate information of the respective positional information transmission device in the table managed by the server, and
      transmit the respective sonic signal, the respective positional information comprising the respective temporary identification information being extractable from the respective sonic signal and usable by a positional information usage device that receives the respective sonic signal to acquire the respective position coordinate information of the respective positional information transmission device from the server, and to determine a current position of the positional information usage device within a geographical coordinate system based on the respective position coordinate information acquired from the server.

2. The positional information transmission system according to claim 1, wherein each respective positional information device of the plurality further includes a sonic wave receiving unit configured to receive at least one of the respective sonic signal that the sonic wave generation unit transmits and a surrounding condition of a sonic wave.

3. The positional information transmission system according to claim 1, wherein:
   the server is configured to transmit the respective position coordinate information of the respective positional information transmission device to the positional information usage device in response to receiving a request from the positional information usage device, the received request including the respective temporary identification information extracted from the respective sonic signal; and
   the at least one network transceiver is configured to,
      communicate with the server via a network to receive the first positional information comprising the first temporary identification information from the server, and
      transfer the received first positional information comprising the first temporary identification information to the first positional information transmission device using the close-range wireless communication.

4. The positional information transmission system according to claim 3, wherein the positional information usage device is configured to:
   extract the respective positional information comprising the respective temporary identification information from the respective sonic signal received from the sonic wave generation unit;
   communicate with the server via the network to request the respective position coordinate information of the respective positional information transmission device using the respective temporary identification information extracted from the respective sonic signal; and
   display the determined current position of the positional information usage device within the geographical coordinate system in combination with a surrounding map based on the respective position coordinate information acquired from the server.

5. The positional information transmission system according to claim 1, wherein the second positional information transmission device of the plurality is configured to:
   receive the determined second positional information, comprising the second temporary identification information for the second positional information transmission device, from the first positional information transmission device using the close-range wireless communication;
   store the determined second positional information comprising the second temporary identification information for the second positional information transmission device in a memory;
   determine third positional information, comprising third temporary identification information for a third positional information transmission device of the plurality, based on the determined second positional information comprising the second temporary identification information; and transmit the determined third positional information comprising the third temporary identification information to the third positional information transmission device using the close-range wireless communication, and to the server via the first positional information transmission device and the at least one network transceiver, with an instruction for the server to associate the third temporary identification information with third specific device identification information and third position coordinate information of the third positional information transmission device in the table managed by the server.

6. The positional information transmission system according to claim 1, wherein:

the respective temporary identification information for each respective positional information transmission device of the plurality may be updated on a regular or irregular basis; and the respective positional information transmitted as the respective sonic signal further includes updated time information when the respective temporary identification information for the respective positional information transmission device is updated.

7. The positional information transmission system according to claim 1, wherein the respective sonic signal is a sonic wave whose frequency range is 16 KHz to 24 KHz.

8. The positional information transmission system according to claim 2, wherein the server is configured to:

receive a surrounding condition of a sonic wave measured by a sonic wave receiving unit included in a respective positional information transmission device of the plurality via the at least one network transceiver;

determine an output level based on the surrounding condition of the sonic wave;

transfer the determined output level to the respective positional information transmission device via the at least one network transceiver, wherein the respective positional information transmission device generates and transmits the respective sonic signal at the determined output level using the sonic wave generation unit and measures the respective sonic signal transmitted at the determined output level using the sonic wave receiving unit to output a measurement result;

receive the measurement result from the respective positional information transmission device via the at least one network transceiver; and check whether or not correct positional information comprising correct temporary identification information is transmitted and output sound pressure corresponds to the determined output level based on the received measurement result.

9. A positional information transmission device, comprising:

a close-range wireless communication unit configured to perform close-range wireless communication with a network transceiver and a second positional information transmission device, the close-range wireless communication unit being configured to, receive, via the network transceiver, first positional information from a server configured to store a table mapping between (i) specific device identification information, (ii) positional information, and (Hi) position coordinate information for each positional information transmission device, wherein the first positional information is generated by the server and comprises first temporary identification information associated with first specific device identification information and first position coordinate information of the positional information transmission device stored in the table managed by the server, determine second positional information, comprising second temporary identification information for the second positional information transmission device, based on the received first positional information comprising the first temporary identification information, and transmit the determined second positional information comprising the second temporary identification information to the second positional information transmission device, and to the server via the network transceiver, with an instruction for the server to associate the second temporary identification information with second specific device identification information and second position coordinate information of the second positional information transmission device in the table managed by the server; and a sonic wave generation unit configured to, generate a sonic signal based on the received first positional information comprising the first temporary identification information associated with the first specific device identification information and the first position coordinate information of the positional information transmission device, and transmit the sonic signal, the received first positional information comprising the first temporary identification information being extractable from the sonic signal and usable by a positional information usage device that receives the sonic signal to acquire the first position coordinate information of the positional information transmission device from the server, and to determine a current position of the positional information usage device within a geographical coordinate system based on the first position coordinate information acquired from the server.

10. The positional information transmission device according to claim 9, further comprising a sonic wave receiving unit configured to receive at least one of the sonic signal that the sonic wave generation unit transmits and a surrounding condition of a sonic wave.

11. The positional information transmission device according to claim 9, further comprising a lighting unit, wherein the lighting unit is supplied with power from a power supply that supplies power to the close-range wireless communication unit and the sonic wave generation unit.

12. The positional information transmission device according to claim 11, wherein the sonic wave generation unit is laid out in an area on a border of a perimeter or an inner periphery other than an area just above an emitting element of the lighting unit.

13. A method of transmitting positional information, the method comprising:

receiving, at a first positional information transmission device via a network transceiver, first positional information from a server configured to store a table mapping between (i) specific device identification information, (ii) positional information, and (iii) position coordinate information for each positional information transmission device of a plurality of positional information transmission devices, wherein the first positional information is generated by the server and comprises first temporary identification information associated with first specific device identification information and first position coordinate information of the first positional information transmission device stored in the table managed by the server, by performing close-range wireless communication with the network transceiver;

determining, by the first positional information transmission device, second positional information, comprising second temporary identification information for a second positional information transmission device of the plurality, based on the received first positional information comprising the first temporary identification information;

transmitting, by the first positional information transmission device, the determined second positional information comprising the second temporary identification information to the second positional information transmission device, and to the server via the network transceiver, using the close-range wireless communication, with an instruction for the server to associate the second temporary identification information with second specific device identification information and second position coordinate information of the second positional information transmission device in the table managed by the server;

generating, by the first positional information transmission device, a sonic signal based on the received first positional information comprising the first temporary identification information associated with the first specific device identification information and the first position coordinate information of the first positional information transmission device; and transmitting, by the first positional information transmission device, the sonic signal, the received first positional information comprising the first temporary identification information being extractable from the sonic signal and usable by a positional information usage device that receives the sonic signal to acquire the first position coordinate information of the first positional information transmission device from the server, and to determine a current position of the positional information usage device within a geographical coordinate system based on the first position coordinate information acquired from the server.

14. The method of transmitting positional information according to claim 13, further comprising:

transferring, by the first positional information transmission device, a surrounding condition of a sonic wave measured by a sonic wave receiving unit included in the positional information transmission device to the server via the network transceiver;

receiving, at the first positional information transmission device, an output level determined by the server based on the surrounding condition of the sonic wave from the server via the network transceiver;

generating and transmitting, by the first positional information transmission device, the sonic signal at the received output level using a sonic wave generation unit included in the first positional information transmission device;

measuring, by the first positional information transmission device, the sonic signal transmitted at the received output level using the sonic wave receiving unit to output a measurement result; and transferring, by the first positional information transmission device, the measurement result to the server via the network transceiver, wherein the measurement result is used by the server to check whether or not correct positional information comprising correct temporary identification information is transmitted and output sound pressure corresponds to the output level determined by the server.

* * * * *